3,127,270
NEW STILBENE COMPOUNDS

Robert Hugh Wilson, Manchester, England, assignor to Imperial Chemical Industries Limited, London, England, a corporation of Great Britain
No Drawing. Filed June 30, 1960, Ser. No. 39,759
Claims priority, application Great Britain July 31, 1959
9 Claims. (Cl. 96—94)

This invention relates to new stilbene compounds and more particularly to compounds containing both stilbene and 1:3:5-triazine groups useful as whitening agents.

It has been found that certain new sulphonated 4:4'-diaminostilbene derivatives in which the nitrogen atoms each carry a 1:3:5-triazine group, each of which contains as substituents two hydroxyalkoxy groups are valuable whitening agents, for polymeric materials particularly for cellulosic materials such as paper and for proteinaceous materials.

According to the invention, therefore, there are provided new water-soluble stilbene compounds free from chromophoric and auxochromic groups of the formula

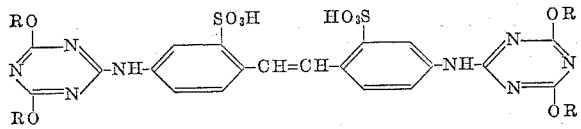

in which R stands for an alkyl or substituted alkyl group containing one or more hydroxyl groups, or salts of such stilbene compounds.

As examples of alkyl or substituted alkyl groups containing one or more hydroxyl groups and represented by R there may be mentioned 2-hydroxyethyl, 2-hydroxypropyl, 2:3-dihydroxypropyl and 2-(2'-hydroxyethoxy)-ethyl. As examples of salts of these stilbene compounds there may be mentioned any water-soluble salt, but in particular those obtained with ammonia, amines, or alkali metals.

Chromophoric groups, for example nitro or arylazo groups, introduce undesirable colour into the compounds of the invention.

Stilbene compounds of the invention useful as whitening agents include 4:4'-bis(4":6"-di-β-hydroxyethoxy-1":3":5" - triazin - 2" - ylamino)stilbene - 2:2' - disulphonic acid and 4:4'-bis(4":6"-di-β-hydroxypropoxy-1":3":5" - triazin - 2" - ylamino)stilbene - 2:2' - disulphonic acid.

The stilbene compounds of the invention may be obtained from cyanuric chloride or bromide by interaction with a 4:4'-diaminostilbene compound to give a 4:4'-bis-(4":6"-dihalogeno-1":3":5"-triazin - 2" - ylamino)stilbene compound which is then reacted with at least two molecular proportions of a phenol in presence of an alkali, resulting in the replacement of 2 or more of the halogen atoms with phenoxy groups, and then with excess of a polyhydric alcohol in presence of a basic catalyst to replace not only any remaining halogen atoms but also the phenoxy groups by hydroxyalkoxy groups. Thus the product obtained from 4:4'-bis(4"-chloro-6"-phenoxy-1":3":5"-triazin-2"-ylamino)stilbene - 2:2' - disulphonic acid and ethylene glycol is 4:4'-bis(4":6"-di-β-hydroxyethoxy-1":3":5"-triazin-2"-ylamino)stilbene - 2:2' - disulphonic acid and not the expected 4"-di-β-hydroxyethoxy-6"-phenoxy compound.

For example two molecular proportions of cyanuric chloride and one molecular proportion of the disodium salt of 4:4'-diaminostilbene-2:2'-disulphonic acid may be interacted in aqueous acetone at 10° C., and the resulting bis-dichlorotriazinyl compound may be reacted with two molecular proportions of phenol at 60° C. or four molecular proportions of phenol at 100° C. in water in presence of caustic soda, and then with ethylene glycol at elevated temperature such as 100° C. in presence of caustic soda, using an excess of ethylene glycol as solvent. Alternatively, a solution of the sodium derivative of ethylene glycol in ethylene glycol can be used in the last stage.

In place of phenol there may be used other compounds which interact with the bis-dihalogenotriazine compound in such a way as to replace two or more of the halogen atoms with groups which are themselves readily replaced by hydroxyalkoxy groups; for example substituted phenols such as cresols, naphthols, or alcohols such as methanol, ethanol, propanol, butanol or amyl alcohol.

Attempts to react the bis-dihalogenotriazine compound directly with hydroxyalcohols give chiefly products containing one or more hydroxy groups attached to the triazine rings. These compounds are inferior whitening agents.

The stilbene compounds of the invention may be used as whitening agents for polymeric materials, particularly cellulosic or proteinaceous matter, in any conventional manner, but it is preferred to apply them from aqueous media.

The stilbene compounds may be used for the whitening of paper for example by addition to the beater or the machine chest, or for the surface whitening of paper by after-treatment. When sizing agents are also employed it is preferable to add these after the stilbene compounds. Application as an after-treatment may be carried out by dipping, spraying, calender staining or by any other conventional method. The stilbene compounds may also be used for improving the whiteness of coating mixes, for example those containing casein.

Other ingredients used in the manufacture of paper may also be added, for example, fillers, wet-strength resins, starches, rosin sizes, aluminium compounds, dyestuffs or other paper auxiliaries.

In the case of cotton an application temperature of between 40° C. and 100° C. and preferably between 60° C. and 80° C. may be used. Substantially neutral or alkaline conditions are preferred. The stilbene compounds may be used if desired in conjunction with washing agents such as soap or synthetic detergents.

The stilbene compounds of the invention may also be used to improve the whiteness of photographic prints and the light-fastness of coloured photographic images for example by incorporation at any stage of the manufacture in the gelatino-silver halide emulsion layer or a protective or separative layer associated with it or by treatment of the film or paper before or after exposure to light with a solution containing the whitening agent.

The stilbene compounds of the invention provide on paper fluorescent effects of exceptional whiteness and brightness which can be built up to a high intensity. The effects are resistant to chemical agents, such as sodium hypochlorite, caustic soda, and strong acids and relatively fast to light.

The invention is illustrated but not limited by the following examples in which the parts and percentages are by weight unless otherwise stated.

Example 1

41.3 parts of the disodium salt of 4:4'-bis(4"-chloro-6"-phenoxy-1":3":5" - triazin - 2" - ylamino)stilbene-2:2'-disulphonic acid are added to a solution obtained by dissolving 2.3 parts of metallic sodium in 250 parts of ethylene glycol. The resulting solution is heated at 100° C. for five hours, and then poured into 650 parts of water. 100 parts of sodium chloride are added, and the precipitated sodium salt of 4:4'-bis(4":6"-di-β-hydroxyethoxy-1":3":5"-triazin-2"-ylamino)stilbene - 2:2' - disulphonic acid is filtered off and dried.

The product is a pale cream powder, which dissolves in water to give solutions showing a brilliant blue fluorescence, which have a marked whitening and brightening effect when applied to cellulosic materials.

*Example 2*

The 41.3 parts of the disodium salt of 4:4'-bis(4''-chloro-6''-phenoxy-1'':3'':5''-triazin - 2'' - ylamino)stilbene-2:2'-disulphonic acid used in Example 1 are replaced by 48.9 parts of the disodium salt of 4:4'-bis(4''-chloro-6''-p-diphenyloxy-1'':3'':5'' - triazin - 2'' - ylamino)stilbene-2:2'-disulphonic acid. The product is identical with that obtained in Example 1.

The 4:4' - bis(4''-chloro-6''-p-diphenyloxy-1'':3'':5''-triazin-2''-ylamino)stilbene-2:2'-disulphonic acid is made by stirring a suspension of 33.2 parts of 4:4'-bis(4'':6''-dichloro-1'':3'':5''-triazin - 2'' - ylamino)stilbene - 2:2'-disulphonic acid in 500 parts of water with a solution of 17 parts of p-hydroxydiphenyl in 200 parts of benzene at 50° C. for 2 hours, caustic soda being added as required to make and keep the suspension alkaline to nitrazine yellow paper. The precipitated disodium salt of 4:4'-bis-(4''-chloro-6''-p-diphenyloxy-1'':3'':5''-triazin - 2'' - ylamino)stilbene-2:2'-disulphonic acid is filtered off and dried at about 60° C.

*Example 3*

47 parts of the disodium salt of 4:4'-bis(4'':6''-diphenoxy-1'':3'':5''-triazin-2''-ylamino)stilbene - 2:2' - disulphonic acid are added to a solution obtained by dissolving 0.6 part of metallic sodium in 125 parts of ethylene glycol. The resulting solution is heated at 100° C. for 24 hours. 375 parts of water and 10 parts of sodium chloride are added, and the precipitated sodium salt of 4:4'-bis(4'':6''-di-β-hydroxyethoxy - 1'':3'':5'' - triazin-2''-ylamino)stilbene-2:2'-disulphonic acid is filtered off and dried.

The product is identical with that prepared by the procedure of Example 1.

The 0.6 parts of metallic sodium in the above example may be replaced by 1.0 part of sodium hydroxide.

*Example 4*

23.5 parts of the disodium salt of 4:4'-bis(4'':6''-diphenoxy-1'':3'':5''-triazin - 2'' - ylamino)stilbene - 2:2'-disulphonic acid are added to a solution obtained by dissolving 1.75 parts of metallic sodium in 125 parts of propylene glycol. The resulting solution is heated at 100° C. for 20 hours, cooled, and the precipitated sodium salt of 4:4' - bis(4'':6''-di-β-hydroxypropoxy-1'':3'':5''-triazin - 2'' - ylamino)stilbene - 2:2' - disulphonic acid is filtered off and crystallised from 10% sodium chloride solution. The product is a pale cream powder, soluble in water to give solutions showing a brilliant blue flourescence, which have a marked whitening and brightening effect when applied to cellulosic materials.

*Example 5*

The procedure of Example 3 is repeated replacing the 47 parts of the disodium salt of 4:4'-bis(4'':6''-diphenoxy-1'':3'':5''-triazin-2''-ylamino)stilbene - 2:2' - disulphonic acid with 17.3 parts of the disodium salt of 4:4'-bis(4'':6''-dimethoxy-1'':3'':5''-triazin - 2'' - ylamino)-stilbene-2:2'-disulphonic acid. The product is identical with that prepared by the procedure of Example 1.

What I claim is:

1. New water soluble whitening agents free from chromophoric and auxochromic groups selected from the group consisting of
    (a) compounds having the formula

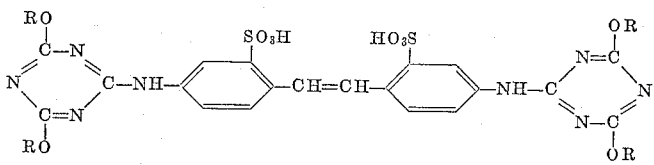

in which R is a member of the group consisting of β-hydroxyethyl and β-hydroxypropyl, and
    (b) salts of said compounds (a).

2. New water soluble whitening agents as set forth in claim 1 in which R is a β-hydroxyethyl group.

3. New water soluble whitening agents as set forth in claim 1 in which R is a β-hydroxypropyl group.

4. A composition of matter comprising a member of the group consisting of cellulosic and proteinaceous polymeric materials having intimately mixed therewith a water soluble whitening agent as set forth in claim 1.

5. A composition of matter as set forth in claim 4 in which the whitening agent is in the form of a salt with a member of the group consisting of ammonia, amines and alkali metals.

6. A composition of matter as set forth in claim 4 in which the polymeric material is a cellulosic material.

7. A composition of matter as set forth in claim 6 in which the cellulosic material is paper.

8. A composition of matter as set forth in claim 4 in which the polymeric material is a gelatino-silver halide photographic emulsion.

9. A process for the manufacture of a member of the group consisting of
    (a) water-soluble stilbene compounds having the formula

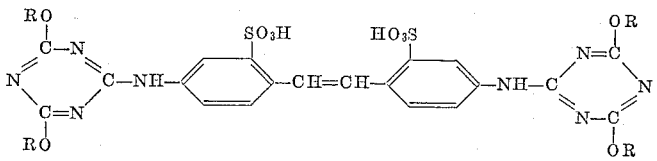

in which R is the member of the group consisting of β-hydroxyethyl and β-hydroxypropyl and
    (b) salts of said compounds (a)
        which comprises reacting a compound having the formula

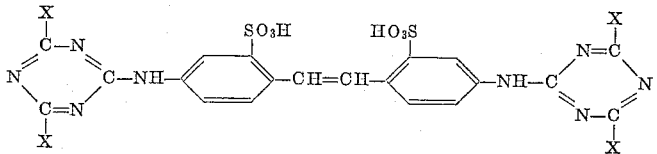

in which each X is a member of the group consisting of chlorine, bromine, cresyloxy, naphthoxy, phenoxy, diphenyl-4-oxy, methoxy, ethoxy, propyloxy, butoxy and amyloxy, at least two of the groups X being a member of the group consisting of cresyloxy, naphthoxy, phenoxy, diphenyl-4-oxy, methoxy, ethoxy, propyloxy, butoxy and amyloxy, with an excess of a polyhydric alcohol selected from the group consisting of ethylene glycol and propylene glycol, in the presence of a basic catalyst.

References Cited in the file of this patent

UNITED STATES PATENTS

| | | |
|---|---|---|
| 2,703,801 | Rottschaefer et al. | Mar. 8, 1955 |
| 2,713,046 | Williams et al. | July 12, 1955 |

FOREIGN PATENTS

| | | |
|---|---|---|
| 972,067 | Germany | May 14, 1959 |